(12) United States Patent
Meulenkamp (10) Patent No.: US 7,658,277 B2
(45) Date of Patent: Feb. 9, 2010

(54) CONVEYOR BELT (75) Inventor: Hennie Hermanus Jozef Meulenkamp, Hengelo (NL)

(73) Assignee: Twentebelt B.V., Hengelo (NL)

( * ) Notice: Subject to any disclaimer, the term of this patent is extended or adjusted under 35 U.S.C. 154(b) by 0 days.

(21) Appl. No.: 11/795,080

(22) PCT Filed: Feb. 13, 2005

(86) PCT No.: PCT/NL2005/000104

§ 371 (c)(1),
(2), (4) Date: Apr. 11, 2008

(87) PCT Pub. No.: WO2006/075912

PCT Pub. Date: Jul. 20, 2006

(65) Prior Publication Data

US 2008/0271979 A1    Nov. 6, 2008

(30) Foreign Application Priority Data

Jan. 12, 2005  (NL) ................................ 1028011

(51) Int. Cl.
*B65G 17/38* (2006.01)
(52) U.S. Cl. ...................... 198/850; 198/848
(58) Field of Classification Search .............. 198/635, 198/850, 853, 848
See application file for complete search history.

(56) References Cited

U.S. PATENT DOCUMENTS

| | | | | |
|---|---|---|---|---|
| 2,141,876 A | * | 12/1938 | Perkins | 198/600 |
| 4,051,949 A | | 10/1977 | Lapeyre | |
| 4,171,045 A | * | 10/1979 | Lapeyre | 198/635 |
| 5,957,268 A | * | 9/1999 | Meulenkamp | 198/850 |
| 6,098,792 A | * | 8/2000 | Olsson | 198/850 |
| 6,193,056 B1 | * | 2/2001 | van Zijderveld et al. | 198/853 |

FOREIGN PATENT DOCUMENTS

| | | |
|---|---|---|
| EP | 0202729 | 11/1986 |
| EP | 0502639 | 9/1992 |
| FR | 2611678 | 9/1988 |
| FR | 2815330 | 4/2002 |
| GB | 519338 | 3/1940 |
| NL | 1005979 | 11/1998 |

\* cited by examiner

*Primary Examiner*—James R Bidwell
(74) *Attorney, Agent, or Firm*—The Webb Law Firm (57) ABSTRACT

An endless conveyor belt comprises a number of links which are each coupled to an adjacent link by means of a hinge. Added to each link is a carrier which has a discrete, flat first carrying surface which consists of the outer surfaces of a number of mutually coupled plates extending with second mutual intermediate spaces in longitudinal direction of the conveyor belt, wherein corresponding plates of adjacent links lie in the same plane. In the second intermediate space there fits a row, extending in transverse direction, of fixedly disposed fingers which extend in longitudinal direction and form a discrete, flat second carrying surface which, at the position of co-action with the first carrying surface, lies in the same plane as this first carrying surface, which fingers are disposed at the end of the active part of the conveyor belt and can take over for further transport objects fed by this conveyor belt in sliding manner while being pushed by objects fed by this conveyor belt.

5 Claims, 10 Drawing Sheets

CONVEYOR BELT

BACKGROUND OF THE INVENTION

The invention relates to an endless conveyor belt, comprising a number of links which are each coupled to an adjacent link by means of a hinge, which comprises a hinge pin extending through a number of registered first eyes present on a first link as well as through a number of second eyes present on an adjacent second link such that the conveyor belt can be bent out of its general main plane;

each of which links comprises a number of elongate elements extending with first mutual intermediate spaces in the longitudinal direction of the conveyor belt.

Such a conveyor belt is generally known.

SUMMARY OF THE INVENTION

It is an object of the invention to embody a known conveyor belt of this type such that, with a high degree of reliability, little wear and a long lifespan and at low cost, it can be made suitable for transporting objects, for instance transporting through a pasteurizing device at a temperature up to about 90° C. cans of beer for pasteurizing (about 62° C.) or fruit juice (in the order of 80-90° C.), and to have the transported objects at the end of the conveyor belt, at the position where the active part is reversed by a foremost roller and guided back on the underside, transferred to a fixedly disposed transport plate on which the products can be transported further while being pushed by the products supplied by the conveyor belt. Driving can take place in pulling and/or pushing manner by means of one or more drive rollers.

In respect of the above, the invention provides an endless conveyor belt of the above specified type which has the feature that the first and the second eyes are located at a mutual distance;

the elongate elements consist of metal;

the eyes form part of the elongate elements;

a carrier is added to each link such that a carrier is movable integrally with an associated link; and the carrier has a discrete, substantially flat first carrying surface which consists of the outer surfaces of a number of mutually coupled plates extending with second mutual intermediate spaces in longitudinal direction of the conveyor belt, wherein corresponding plates of adjacent links lie in the same plane;

this such that in the second intermediate space there fits a row, extending in transverse direction, of fixedly disposed fingers which extend in longitudinal direction and which form part of a transporting device to which the conveyor belt must be added, which fingers have a discrete, substantially flat second carrying surface which, at the position of co-action with the first carrying surface, lies in the same plane as this first carrying surface, which fingers are disposed at the end of the active part of the conveyor belt and can take over for further transport objects fed by the conveyor belt in sliding manner while they are being pushed by objects fed by this conveyor belt.

Attention is drawn to the fact that an endless conveyor belt exists wherein the links are embodied such that the above described carriers, which are embodied wholly in plastic, are also the links. The known conveyor belt is thus embodied wholly in plastic. The drawback of this known conveyor belt is that its thermal and chemical resistance, its tensile strength and resistance to elongation leave something to be desired. Reliability is not therefore guaranteed, certainly not in the longer term, and premature breakdown and the necessity of replacement, or at least substantial maintenance, can be expected.

Since the endless conveyor belt according to the invention is embodied such that the tensile forces occurring in the conveyor belt are transmitted by the metal links wholly onto each other, the conveyor belt of the invention is very reliable in the stated sense and the expectation is that it will have a very long lifespan.

A carrier can be mounted on a link in any suitable manner.

Often recommended is an embodiment which has the feature that each carrier has a set of registered third and fourth eyes, wherein the two associated hinge pins also extend through these respective third and fourth eyes; and that each eye is present in a plate-like element which forms part of the carrier and which fits into said first intermediate space.

During manufacture of the conveyor belt, i.e. assembly of the links and hinges, the carriers can be co-assembled. A particular embodiment can in this respect have the feature that the third and the fourth eyes are closed rings.

Another embodiment has the special feature that the third and fourth eyes are open rings such that they can be coupled by means of a snap connection to an associated hinge pin. This variant has the advantage that each carrier can be easily removed and replaced by a replacement carrier without disassembly and reassembly of the two hinges of the link in question being necessary for this purpose.

Technically superior is an embodiment in which the links and the hinge pins consist of metal, for instance stainless steel.

In a preferred embodiment, the conveyor belt has the feature that the carrier consists of plastic. It is noted here that the carrier is not subjected to the high tensile stresses mentioned in the foregoing, which are after all absorbed by the basic metal construction.

The plastic does however have to be chosen with a view to the operating conditions under which the conveyor belt must operate in practice.

The conveyor belt can in this respect have for instance the special feature that the plastic is of a type which only softens, or otherwise degrades mechanically and/or chemically, at a temperature above about 90° C.

This latter variant in particular provides the option of applying the conveyor belt for the transport of cans of beer or fruit juice for pasteurizing through a pasteurizing device, which operates at a temperature of respectively 62° C. and 80-90° C.

A very suitable choice consists of the plastic being POM, PP or PE, optionally with a reinforcement consisting of glass fibres.

BRIEF DESCRIPTION OF THE DRAWINGS

The invention will now be elucidated with reference to the accompanying drawings of two random embodiments.

In the drawings.

DETAILED DESCRIPTION OF THE PRESENT INVENTION

Figure 1:
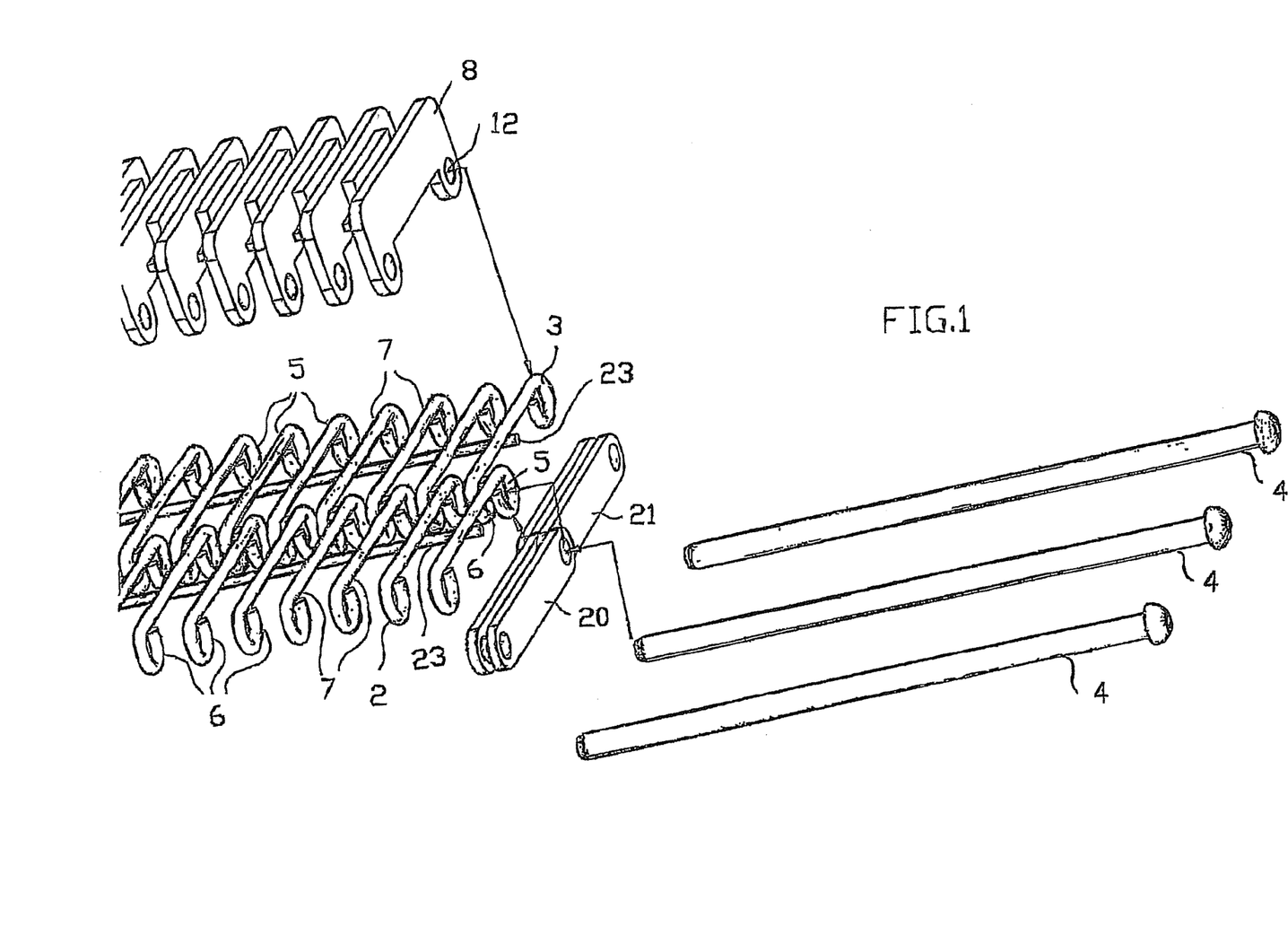
FIG. 1 shows an exploded view of a part of a first exemplary embodiment of a conveyor belt according to the invention.

FIG. 1 shows an endless conveyor belt 1 comprising a number of links 2 which are each coupled to an adjacent link 3 by means of a hinge, which comprises a hinge pin 4 which extends through a number of registered first eyes 5 present on a first link 2 as well as through a number of second eyes 6 present on an adjacent second link 2 such that the conveyor belt can be bent out of its general main plane; each of which links 2, 3 comprises a number of elongate elements 7 extending with first mutual intermediate spaces in the longitudinal direction of the conveyor belt; wherein the first 5 and the second 6 eyes are located at a mutual distance; the elongate elements 7 consist of metal; the eyes 5, 6 form part of the elongate elements; a carrier 8, 9 is added to each link 2, 3, which carrier has a set of registered third 10, 11 and fourth 12, 13 eyes respectively, wherein the two associated hinge pins 4 also extend through these respective third 10, 11 and fourth 12, 13 eyes such that a carrier 8, 9 is movable integrally with an associated link 2, 3; each eye 5, 6 is present in a plate-like element 14, 15 which forms part of the carrier and which fits into said first intermediate space; the carrier 8, 9 has a discrete, substantially flat first carrying surface 18 which consists of the outer surfaces 16 of a number of mutually coupled plates 14, 15 extending with second mutual intermediate spaces in longitudinal direction of the conveyor belt, wherein corresponding plates 14, 15 of adjacent links 2, 3 lie in the same plane; this such that in the second intermediate space there fits a row, extending in transverse direction, of fixedly disposed fingers 16 which extend in longitudinal direction and which form part of a transporting device to which conveyor belt 1 must be added, which fingers 16 have a discrete, substantially flat second carrying surface 17 which, at the position of co-action with the first carrying surface 18, lies in the same plane as this first carrying surface 18, which fingers 16 are disposed at the end of the active part 19 of conveyor belt 1 and can take over for further transport objects fed by the conveyor belt in sliding manner while they are being pushed by objects fed by this conveyor belt 1.

For purposes of strength, a tensively strong end section 20; 21 consisting of stainless steel is added in this embodiment to each link on both sides. Said end sections 20; 21 are pivotally connected to each other by means of hinge pins 4 and can be moved integrally with links 2; 3. The end sections can also consist of a plastic such as nylon and serve as slide blocks by means of which conveyor belt 1 is supported slidably by wear-resistant support surfaces extending in longitudinal direction, for instance of stainless steel.

Each link comprises an array of mutually parallel elongate elements 7 which consist of stainless steel wires, the ends of which are bent round to form the first and second eyes 5, 6. These wires 7 are fixed to each other in their centre zone by means of a welded connection using a wire 23, likewise of stainless steel, whereby elongate elements 7 together form a unitary link 2, 3.

Figure 2:
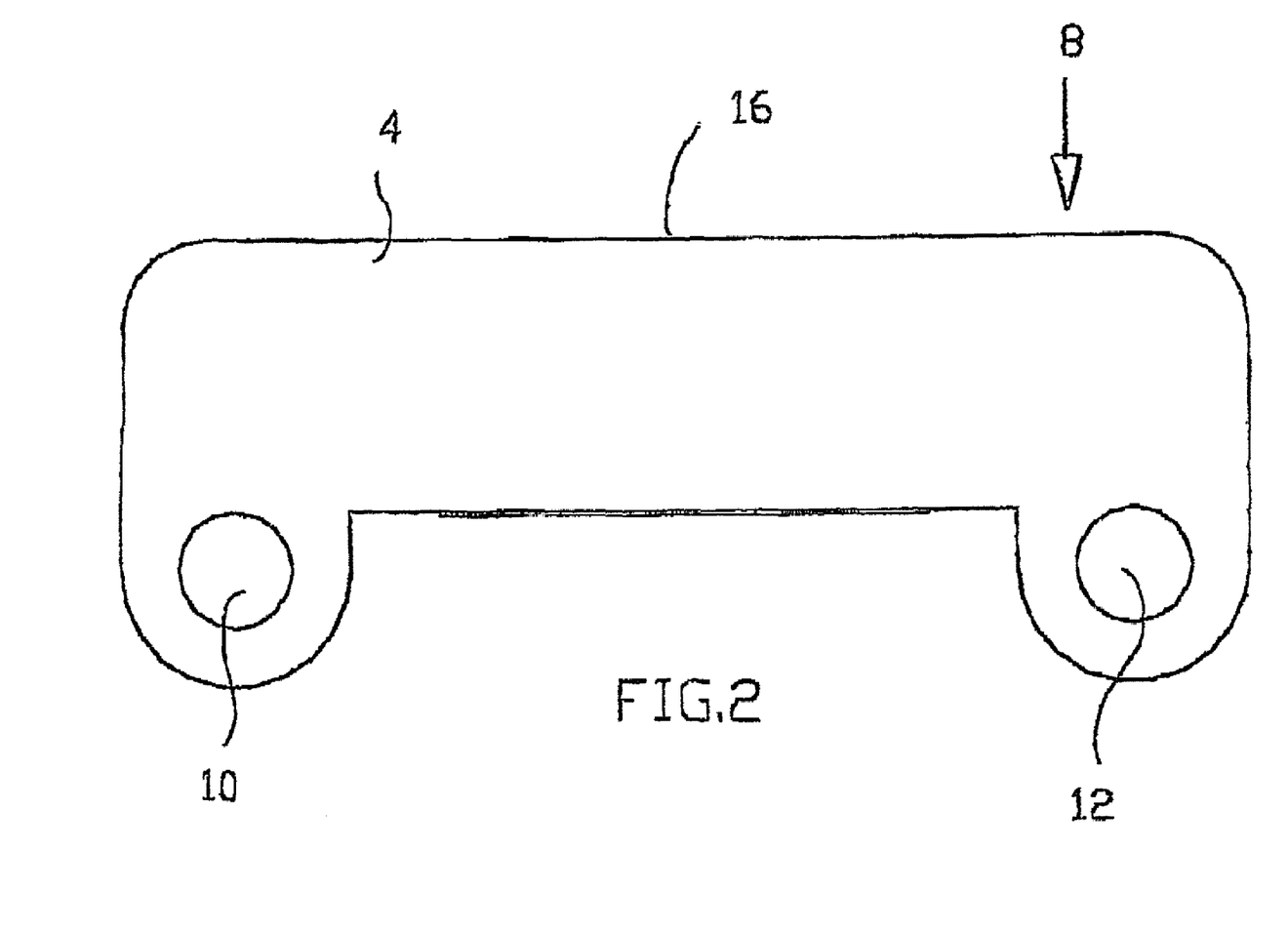
FIG. 2 is a side view of the carrier applied in FIG. 1.

FIG. 2 shows the side view of carrier 8.

Figure 3:
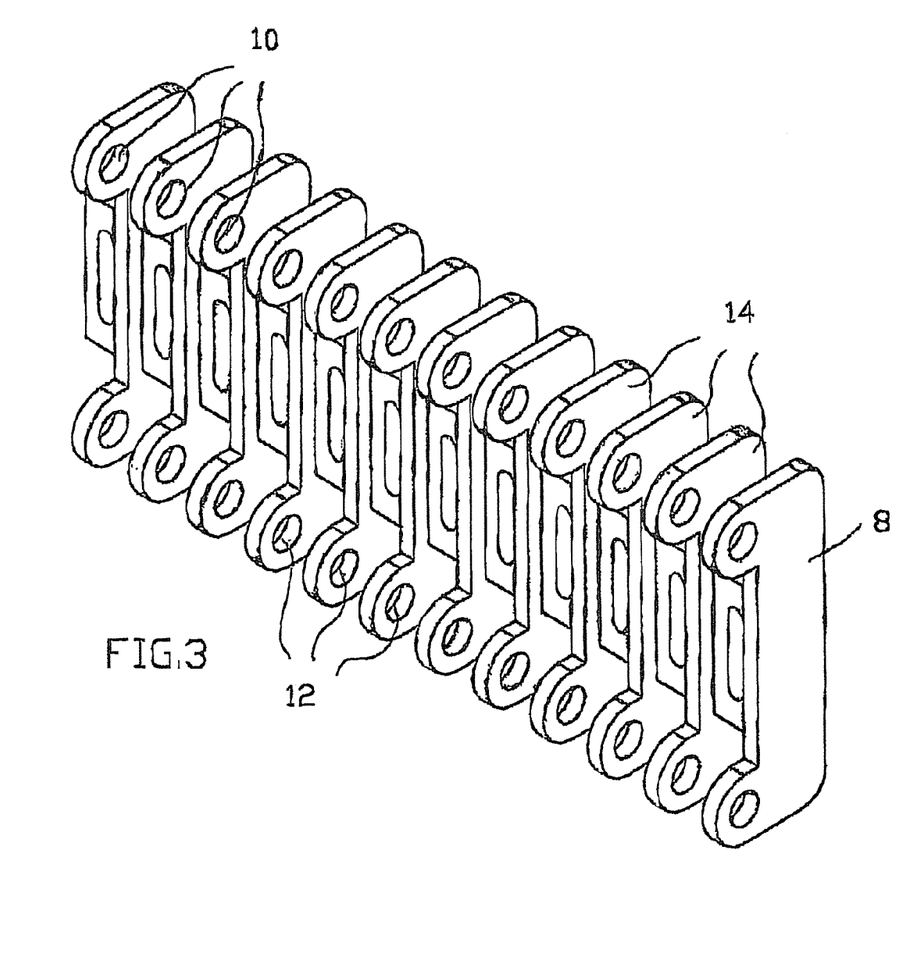
FIG. 3 is a perspective view of the carrier shown in FIG. 2.

As shown clearly in FIGS. 1, 2 and 3, carrier 8 is formed such that the third and fourth eyes 10; 12 are closed rings.

Only by removing the associated two hinge pins 4 can a carrier 18 be removed and for instance replaced by another.

Figure 4:
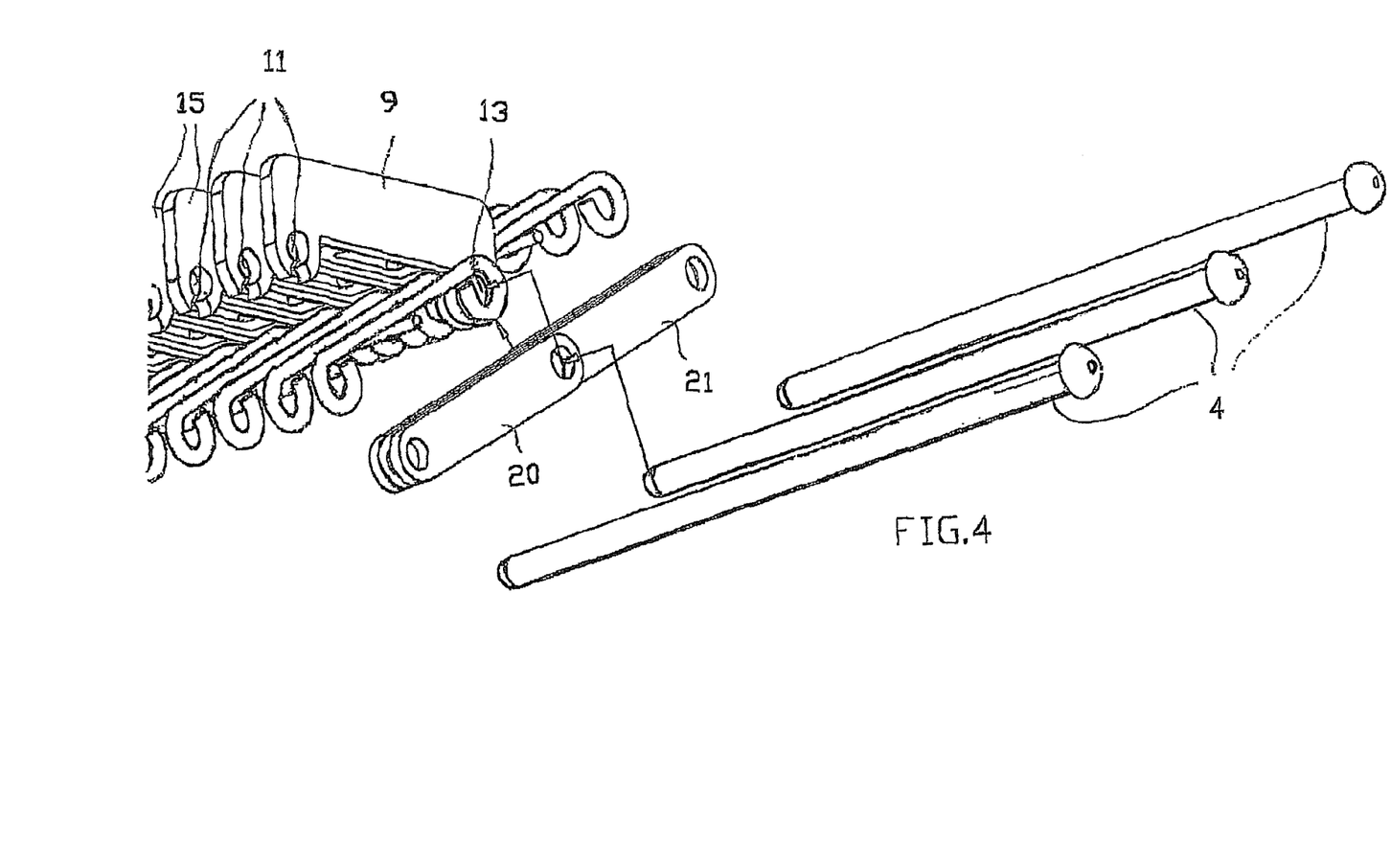
FIG. 4 shows an exploded view of a second exemplary embodiment.
Figure 5:
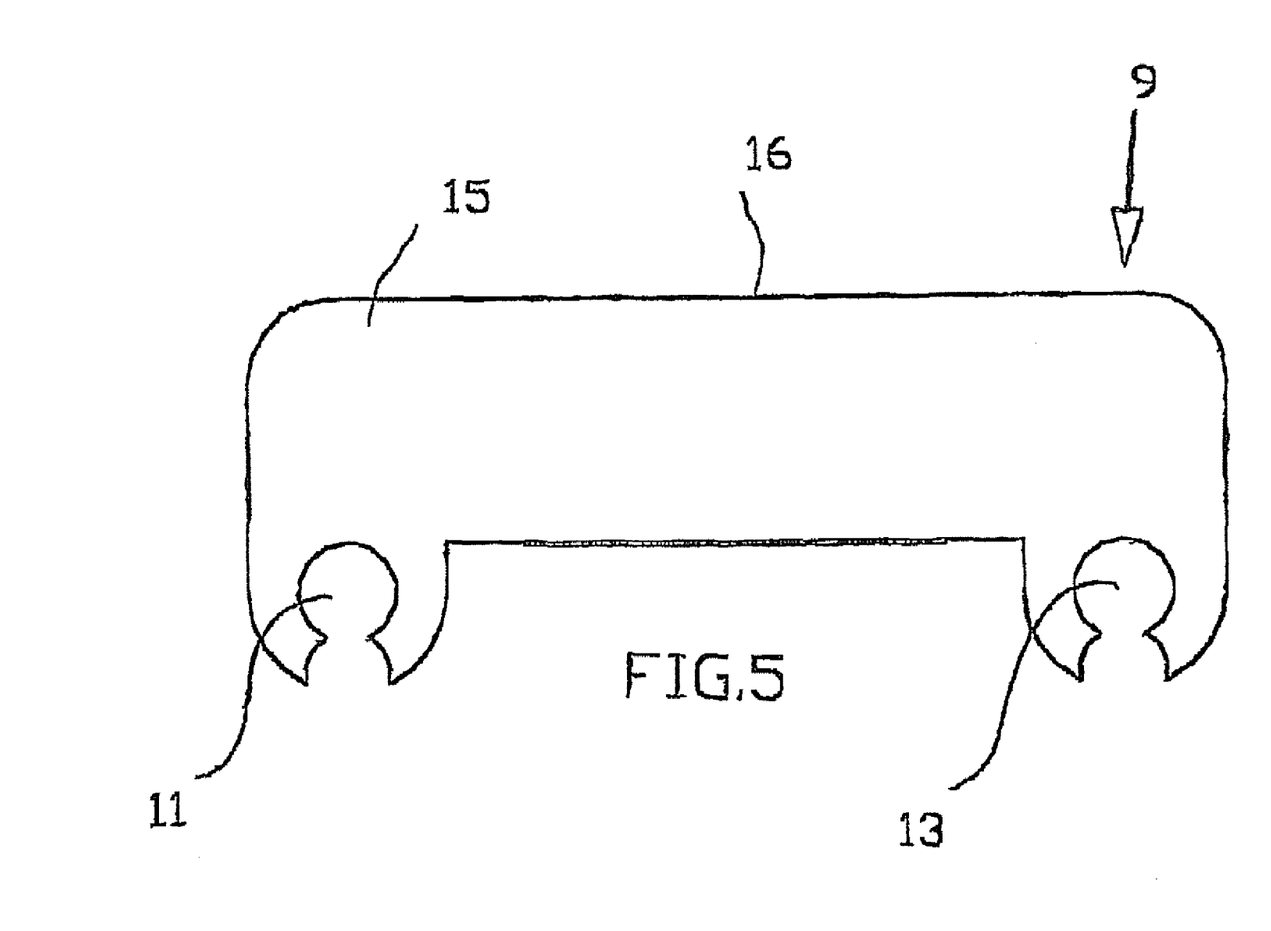
FIG. 5 is a side view of the carrier shown in FIG. 4.
Figure 6:
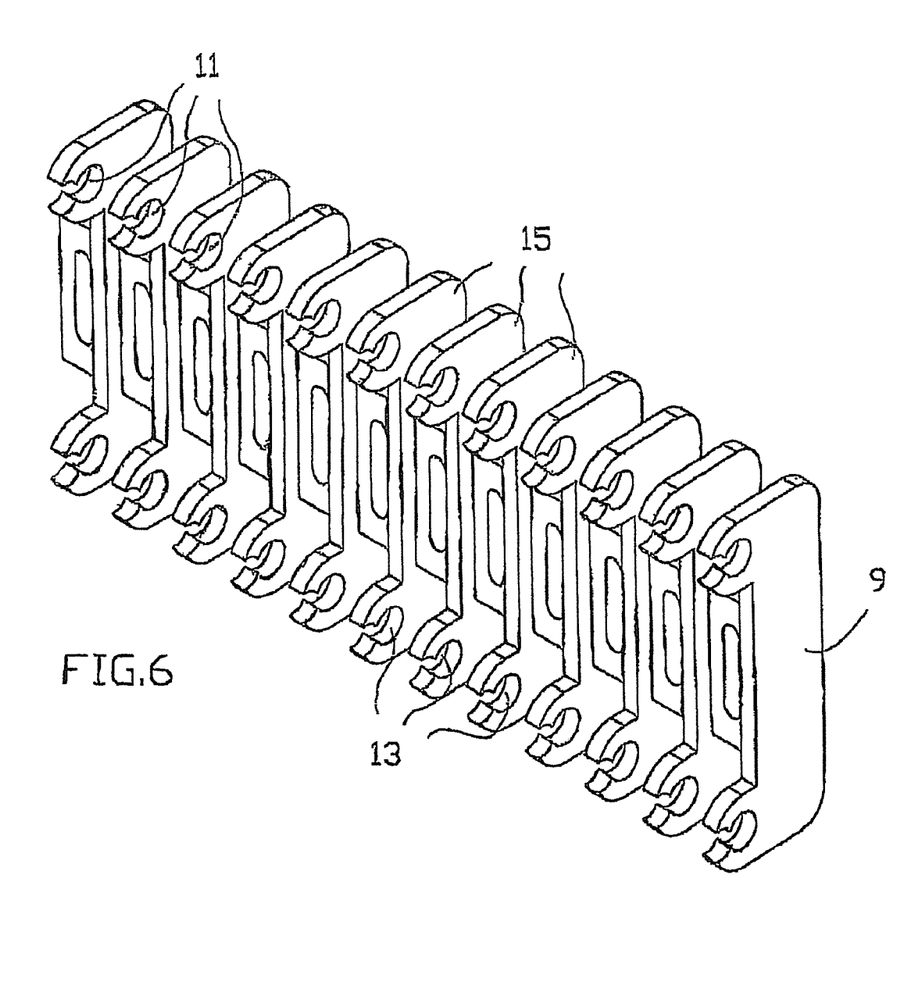
FIG. 6 is a perspective view of the carrier of FIG. 5.
Figure 7:
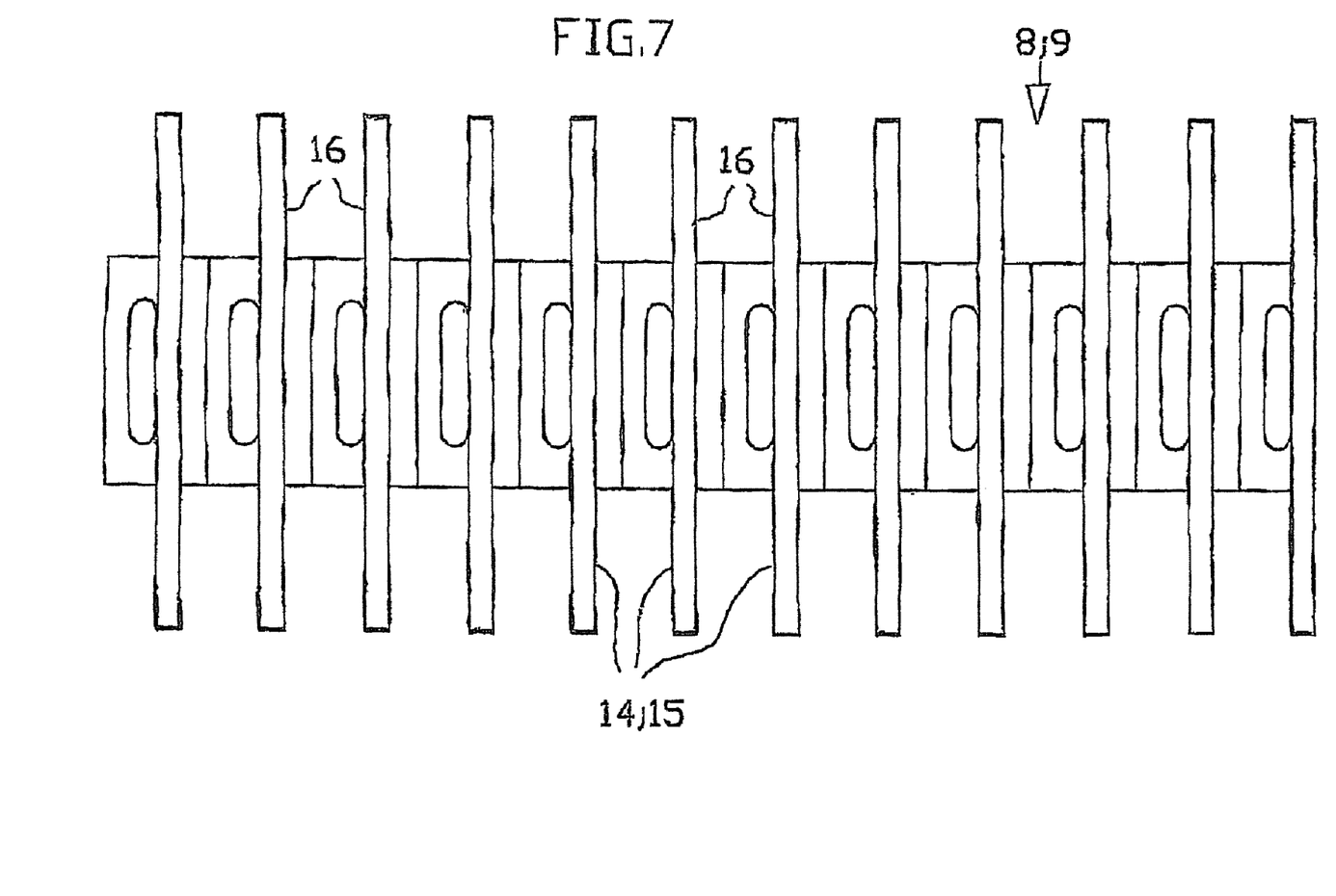
FIG. 7 is a top view of the carrier.

In an embodiment as according to FIGS. 4, 5 and 6, the third and fourth eyes 11, 13 are open rings such that they can be coupled by means of a snap connection to an associated hinge pin 4. In order to replace a carrier 9 embodied in this manner, carrier 9 need only be removed with some force from the associated hinge pin 4 in the manner indicated in FIG. 4 and another carrier 9 embodied in the same manner can once again be placed by means of a snap connection. It will be apparent that the replacement of a carrier of this type is somewhat simpler than in the embodiment of FIGS. 1, 2 and 3.

Figure 8:
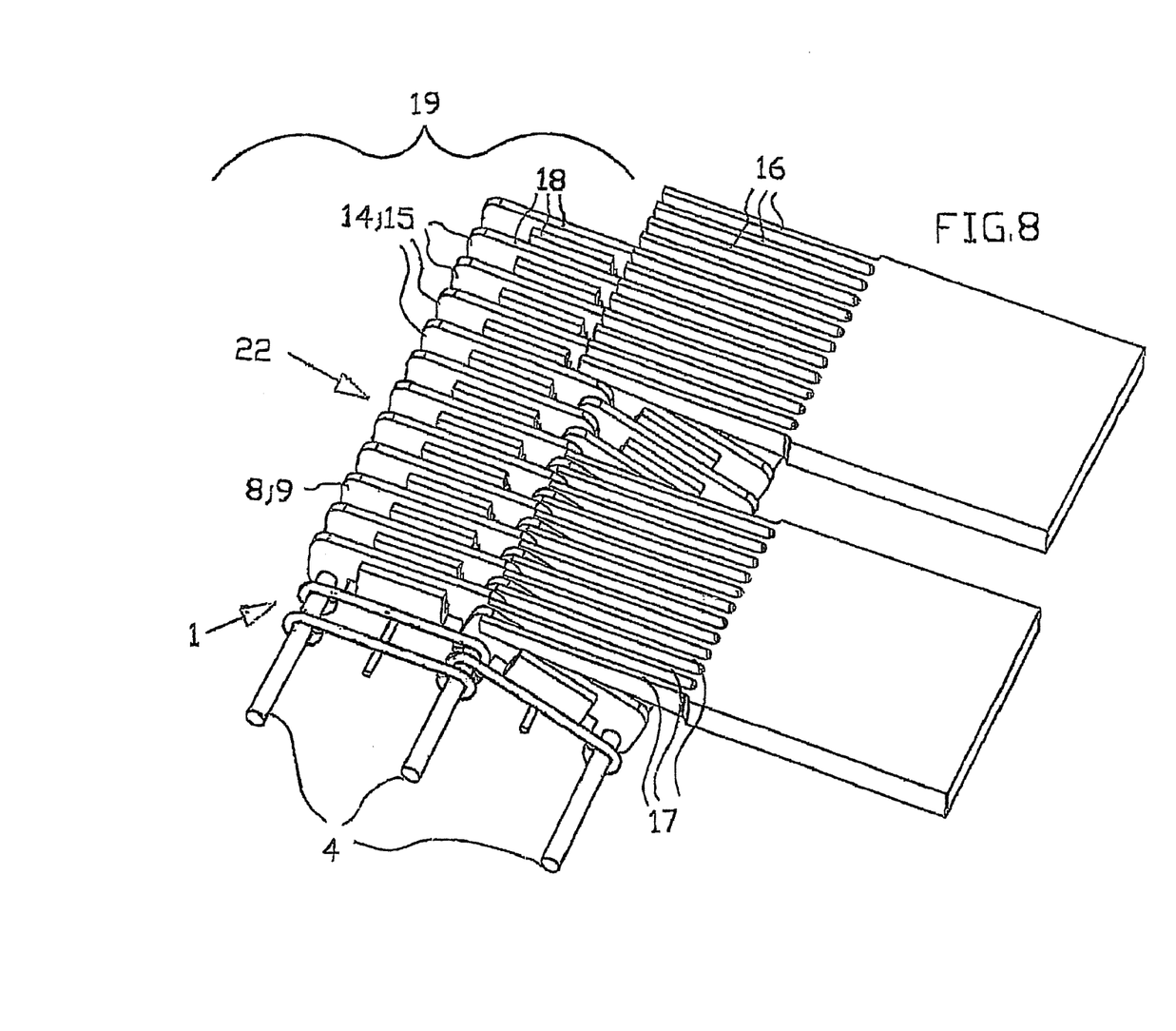
FIG. 8 shows a part of the conveyor belt which co-acts with transfer fingers, partly in perspective view and partly in exploded view.
Figure 9:
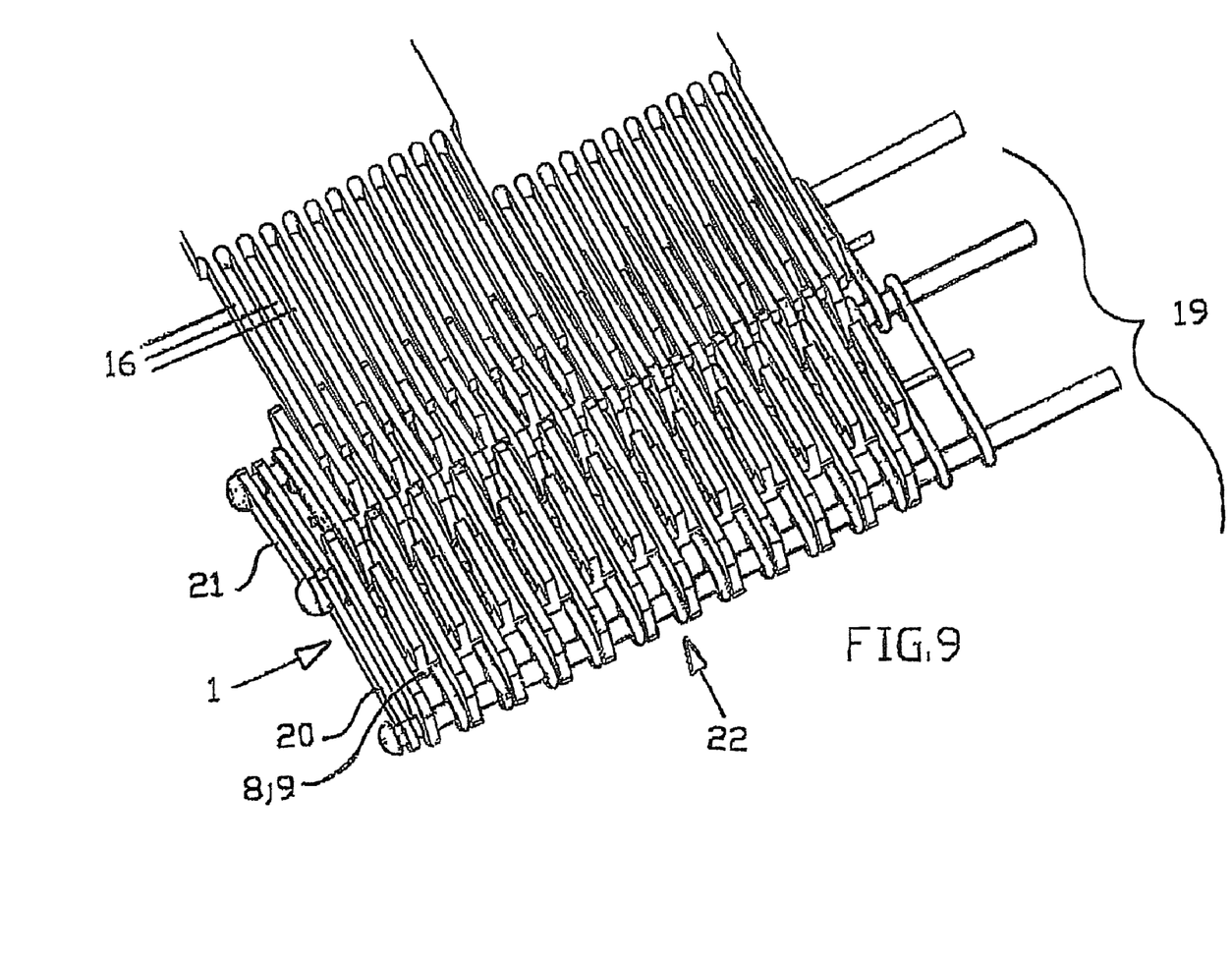
FIG. 9 shows the part of the conveyor belt as also drawn in FIG. 8, partly in perspective view and partly in exploded view, from another angle of view.

FIGS. 8 and 9 show the manner in which conveyor belt 1 according to the invention can co-act with the fingers 16 forming part of a transporting device to which conveyor belt 1 has to be added.

FIG. 8 in particular shows that the first carrying surface 18, which in the region of the active part 19 of conveyor belt 1 is substantially flat and extends in a horizontal plane, lies in the same plane as the second carrying surface 17, i.e. the upper surface of the fingers. A smooth transition of products fed by conveyor belt 1 onto the fingers for further transport is thus ensured.

Figure 10:
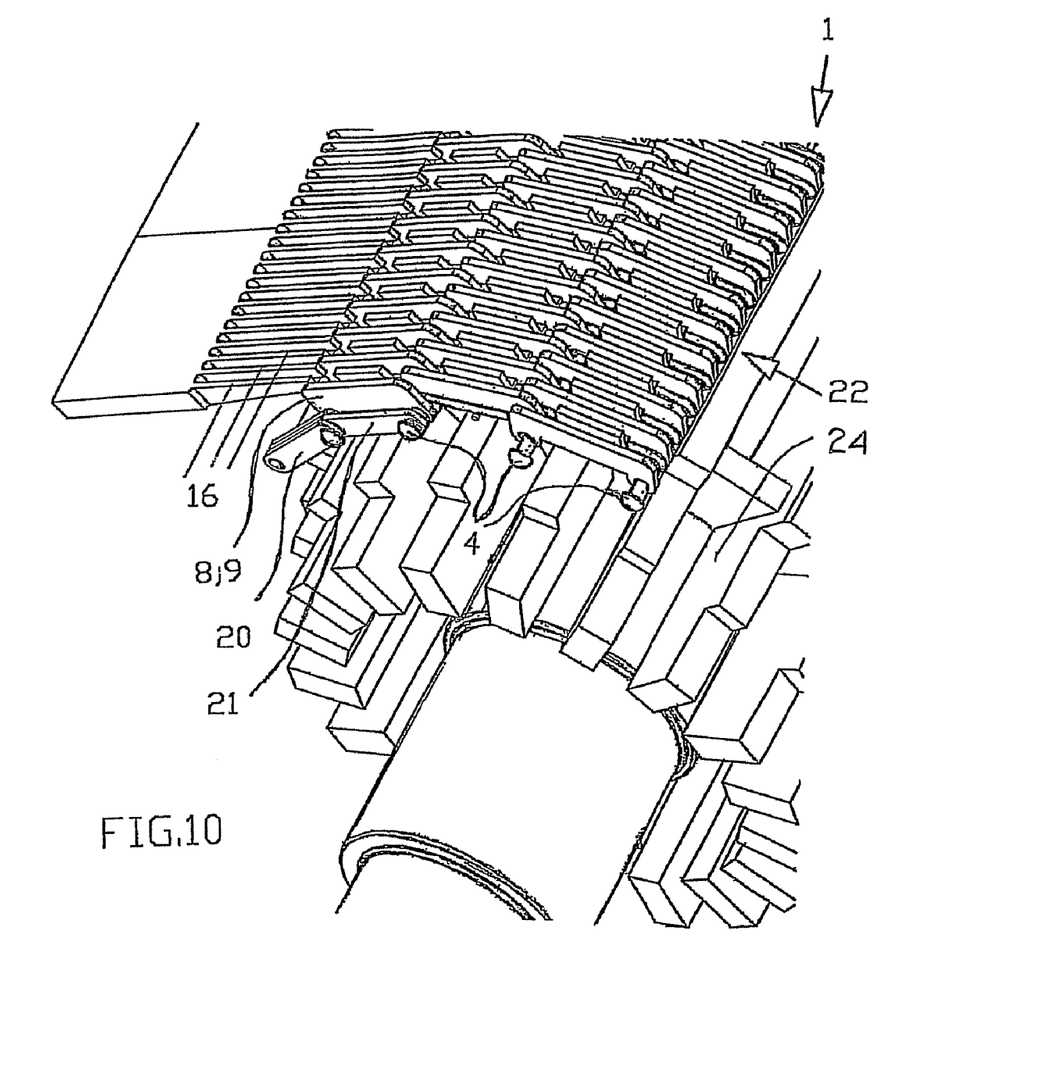
FIG. 10 shows a perspective view of a part of a conveyor belt according to the invention at the position of the driven roller at the end of the active part of the conveyor belt.

FIG. 10 shows a roller 24 which is driven by means which are not drawn and which transports conveyor belt 1 in the direction designated with reference numeral 22.

In addition to the manner drawn in the figures and elucidated in the description, the carriers can also be mounted in other manner on the links. They may for instance not be coupled to hinge pins 4, but to elongate elements 7, eyes 5, 6 or the stainless steel wires 23 extending in transverse direction relative to the transporting direction.

The invention claimed is:

1. An endless conveyor belt, comprising a number of links which are each coupled to an adjacent link by means of a hinge which comprises a hinge pin extending through a number of registered first eyes present on a first link as well as through a number of second eyes present on an adjacent second link such that the conveyor belt can be bent out of its general main plane;

each of which links comprises a number of elongate elements extending with first mutual intermediate spaces in the longitudinal direction of the conveyor belt; wherein the first and the second eyes are located at a mutual distance;

the elongate elements consist of metal;

the eyes form part of the elongate elements;

a carrier is added to each link such that a carrier is movable integrally with an associated link; and the carrier has a discrete, substantially flat first carrying surface which consists of the outer surfaces of a number of mutually coupled plates extending with second mutual intermediate spaces in longitudinal direction of the conveyor belt, wherein corresponding plates of adjacent links lie in the same plane;

this such that in the second intermediate space there fits a row, extending in transverse direction, of fixedly disposed fingers which extend in longitudinal direction and which form part of a transporting device to which the conveyor belt must be added, which fingers have a discrete, substantially flat second carrying surface which, at the position of co-action with the first carrying surface, lies in the same plane as this first carrying surface, which fingers are disposed at the end of the active part of the conveyor belt and can take over for further transport objects fed by this conveyor belt in sliding manner while they are being pushed by objects fed by this conveyor belt, wherein each carrier has a set of registered third and fourth eyes, wherein the two associated hinge pins also extend through these respective third and fourth eyes; and that each eye is present in a plate-like element which forms part of the carrier and which fits into said first intermediate space, and wherein the third and the fourth eyes are open rings such that they can be coupled by means of a snap connection to an associated hinge pin.

2. The conveyor belt as claimed in claim 1, wherein the links and the hinge pins consist of metal, for instance stainless steel.

3. The conveyor belt as claimed in claim 1, wherein the carrier consists of plastic.

4. The conveyor belt as claimed in claim 3, wherein the plastic is of a type which only softens, or otherwise degrades mechanically and/or chemically, at a temperature above about 90° C.

5. The conveyor belt as claimed in claim 1, wherein the plastic is POM, PP or PE, optionally with a reinforcement consisting of glass fibres.

\* \* \* \* \*